US009237185B2

(12) United States Patent
Sasano et al.

(10) Patent No.: US 9,237,185 B2
(45) Date of Patent: Jan. 12, 2016

(54) FILE TRANSFER APPARATUS AND CONTROL METHOD THEREOF

(75) Inventors: Jun Sasano, Tokyo-to (JP); Tomohide Oka, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 983 days.

(21) Appl. No.: 13/116,271

(22) Filed: May 26, 2011

(65) Prior Publication Data

US 2011/0296010 A1     Dec. 1, 2011

Related U.S. Application Data

(60) Provisional application No. 61/350,179, filed on Jun. 1, 2010, provisional application No. 61/350,233, filed on Jun. 1, 2010.

(51) Int. Cl.
*H04L 29/08*          (2006.01)

(52) U.S. Cl.
CPC ............................. *H04L 67/06* (2013.01)

(58) Field of Classification Search
CPC   H04L 47/30; H04L 12/66; H04N 2201/0094; H04N 2201/0075; H04N 2201/0039; G06F 3/1292; G06F 3/1204
USPC ........................ 709/224, 203, 223; 711/113
See application file for complete search history.

(56) References Cited

U.S. PATENT DOCUMENTS

| | | | | |
|---|---|---|---|---|
| 5,444,438 A | * | 8/1995 | Goldberg | ............... G08B 5/227 340/7.23 |
| 6,452,695 B1 | * | 9/2002 | Casey et al. | .................... 358/1.6 |
| 8,520,238 B2 | * | 8/2013 | Utsubo | ........................ 358/1.15 |
| 2001/0033642 A1 | * | 10/2001 | Abrishami et al. | ...... 379/100.01 |
| 2002/0143973 A1 | * | 10/2002 | Price | ................. H04L 29/06027 709/231 |
| 2003/0135382 A1 | * | 7/2003 | Marejka | .............. G06F 11/0709 709/232 |
| 2004/0014489 A1 | * | 1/2004 | Miyachi et al. | ... H04M 1/72519 455/550.1 |
| 2004/0196900 A1 | * | 10/2004 | Lim et al. | ...................... 375/240 |
| 2006/0212603 A1 | * | 9/2006 | Satoh et al. | .................... 709/250 |

(Continued)

FOREIGN PATENT DOCUMENTS

| | | |
|---|---|---|
| JP | 09-135335 | 5/1997 |
| JP | 10-107983 | 4/1998 |
| JP | 11-069035 | 3/1999 |

(Continued)

OTHER PUBLICATIONS

Final Office Action for Japanese Patent Application No. 2011-123597 Dated Oct. 21, 2014, 6 pages.

(Continued)

*Primary Examiner* — Duyen Doan
(74) *Attorney, Agent, or Firm* — Amin, Turocy & Watson, LLP

(57) ABSTRACT

In one embodiment, a file transfer apparatus includes a storing device, a determination unit, and a notification unit. The storing unit stores transfer information between the file transfer apparatus and a second file transfer apparatus. The determination unit determines an insufficient state when the latest value of a numerical value which varies depending on a use situation of the region meets a predetermined condition. The notification unit notifies, as a response to the determination of the insufficient state by the determination unit, the gist thereof to a user.

9 Claims, 11 Drawing Sheets

(56) References Cited

U.S. PATENT DOCUMENTS

2009/0190147 A1* 7/2009 Uruta et al. .................... 358/1.9
2010/0146163 A1* 6/2010 Son et al. ........................ 710/54

FOREIGN PATENT DOCUMENTS

| JP | 2002-064674 | 2/2002 |
| JP | 2004-282386 | 10/2004 |
| JP | 2005-192107 | 7/2005 |
| JP | 2006-229577 | 8/2006 |

OTHER PUBLICATIONS

Japanese Office Action for Japanese Patent Application No. 2011-123597 mailed on Apr. 1, 2014.

* cited by examiner

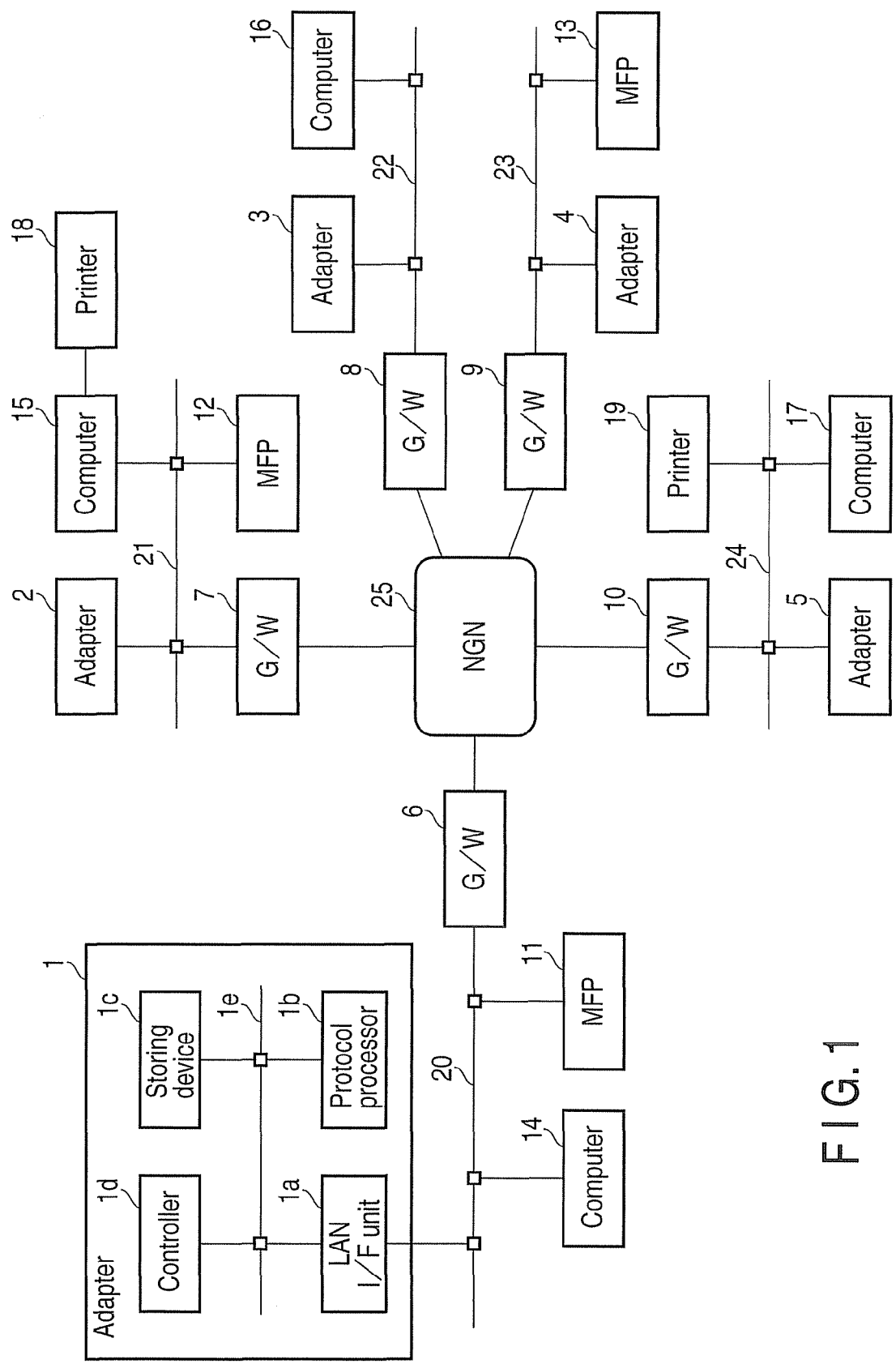
F I G. 1

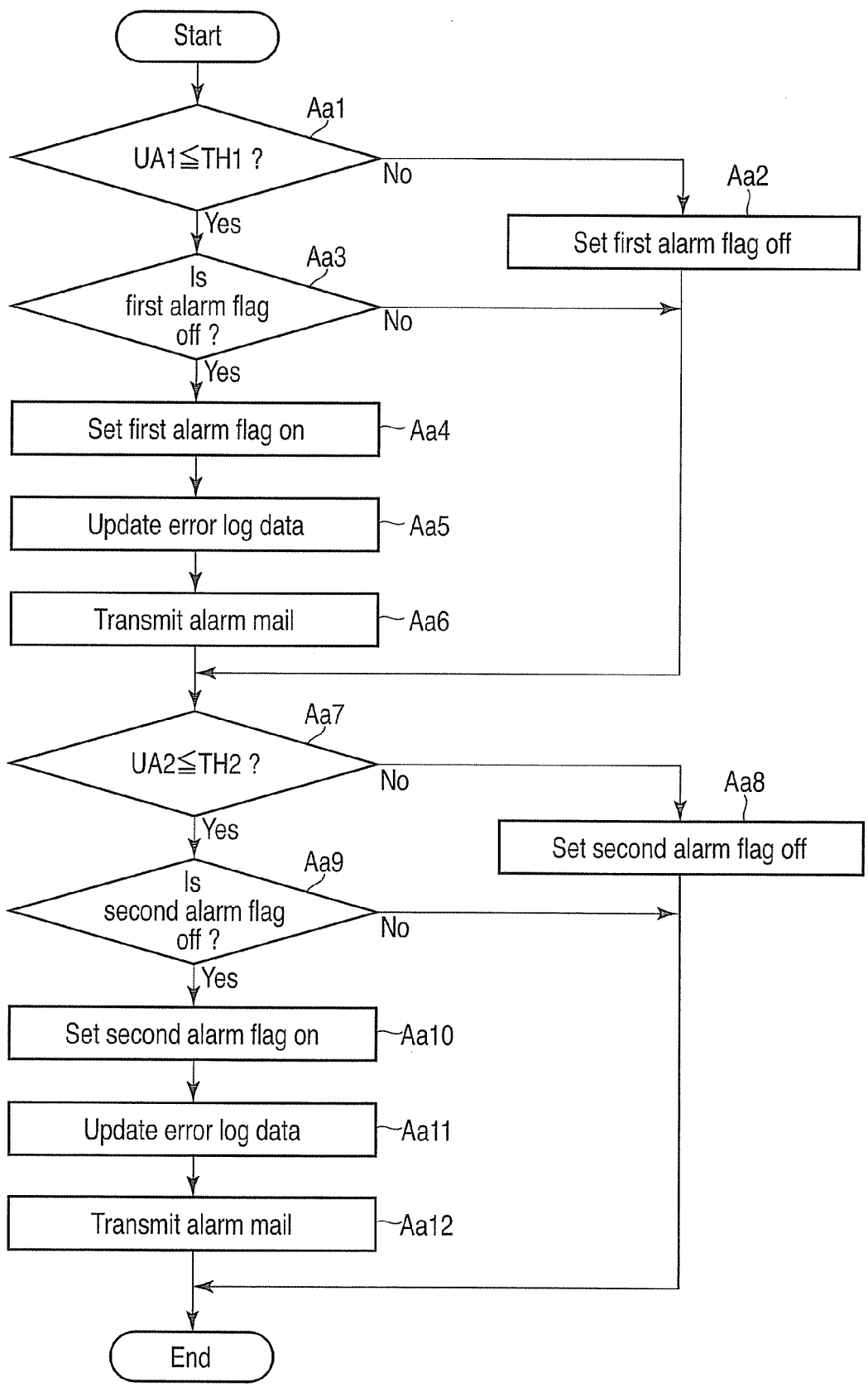
F I G. 2

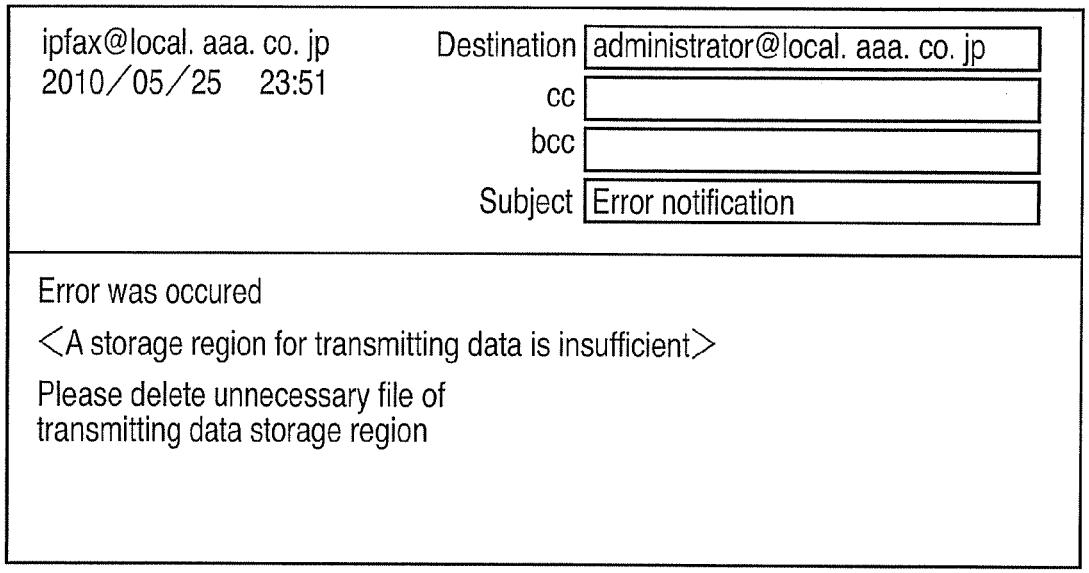
F I G. 3
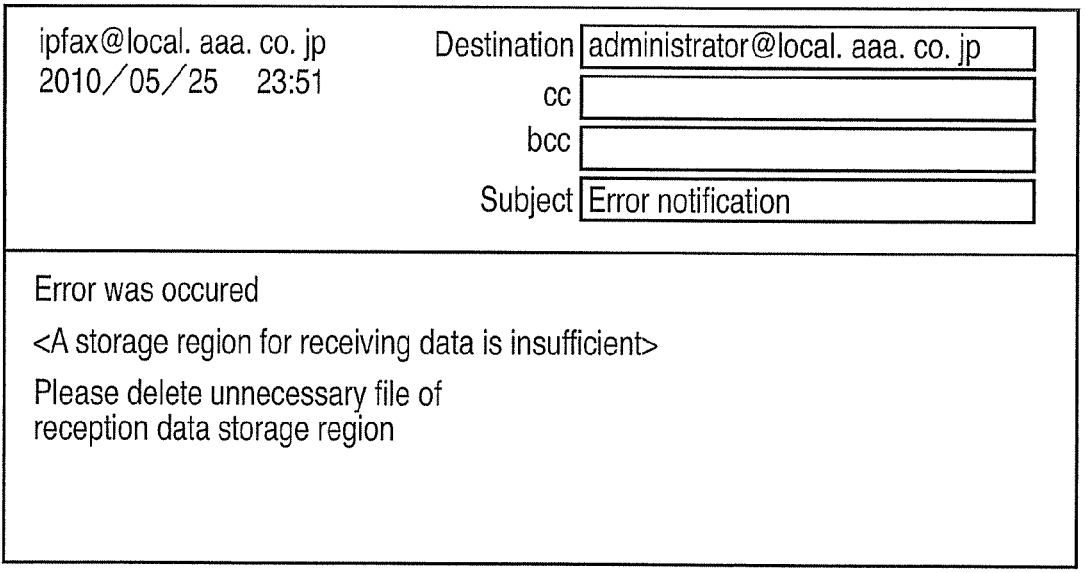
F I G. 4

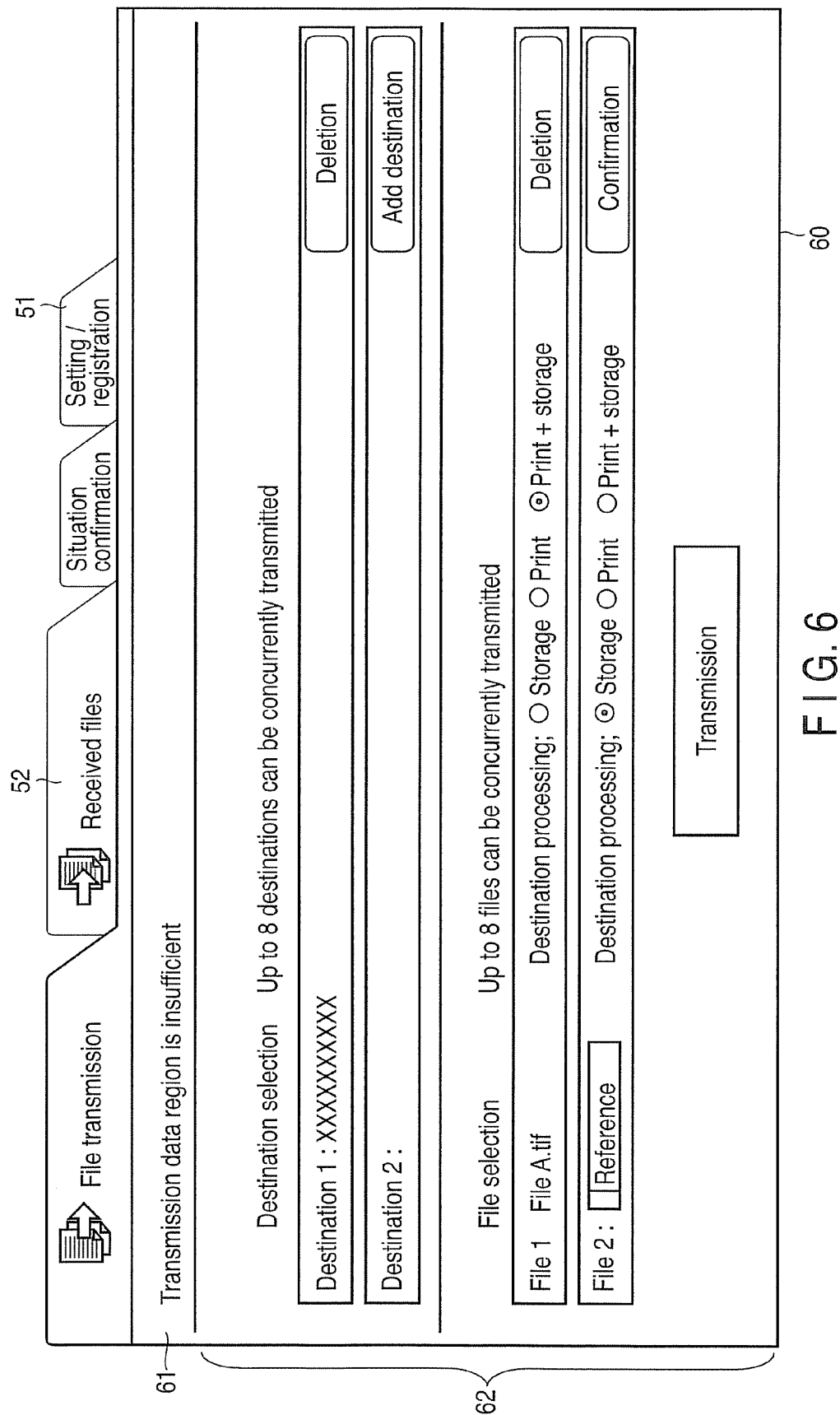
F I G. 6

|  | 0 O'clock | 1 O'clock | 2 O'clock | · · · · · | 22 O'clock | 23 O'clock |
| --- | --- | --- | --- | --- | --- | --- |
| Today | 20,5 | 20,23 | — | · · · · · | — | — |
| A day ago | 21,5 | 15,4 | 10,22 | · · · · · | 36,4 | 32,7 |
| Two days ago | 17,4 | 12,6 | 0,21 | · · · · · | 29,2 | 29,5 |
| ⋮ | ⋮ | ⋮ | ⋮ | ⋮ | ⋮ | ⋮ |
| 29 Days ago | 25,10 | 15,31 | 8,29 | · · · · · | 40,8 | 30,15 |
| 30 Days ago | 29,14 | 17,30 | 13,13 | · · · · · | 30,9 | 31,19 |

FIG.10

FILE TRANSFER APPARATUS AND CONTROL METHOD THEREOF

CROSS-REFERENCE TO RELATED APPLICATIONS

This application is based upon and claims the benefit of priority from U.S. provisional applications 61/350,179, filed on Jun. 1, 2010; and 61/350,233, filed on Jun. 1, 2010 the entire contents of both of which are incorporated herein by reference.

FIELD

Embodiments described herein relate generally to a file transfer apparatus and a control method thereof.

BACKGROUND

A file transfer apparatus, which allows an information terminal such as a personal computer or a multi functional peripheral (MFP) to transfer a file by the use of a communication network such as a next generation network (NGN), is known as a network adapter, or simply, adapter.

The adapter is equipped with a storage medium, and stores a file becoming a transfer target in the storage medium. Since a storage capacity of the storage medium is limited, space in the storage medium may run out during writing of the file, which halts the writing of the file. Moreover, in this case, after securing an free region of the storage medium, the acquisition of the file resumes from the beginning.

Under such circumstances, when a capacity of the free region is low, it has been desired that a user is made aware of the situation.

BRIEF DESCRIPTION OF THE DRAWINGS

FIG. 1 illustrates a block diagram of a configuration of an adapter according to an embodiment and a configuration of a communication system included in the adapter.

FIG. 2 illustrates a flow chart of processing in a first embodiment according to a controller in FIG. 1.

FIG. 3 illustrates an example of an alarm mail.

FIG. 4 illustrates an example of an alarm mail.

FIG. 6 illustrates an example of a UI screen displayed by a computer in FIG. 1.

FIG. 10 schematically illustrates an example of a content of history data.

DETAILED DESCRIPTION

Figure 5:
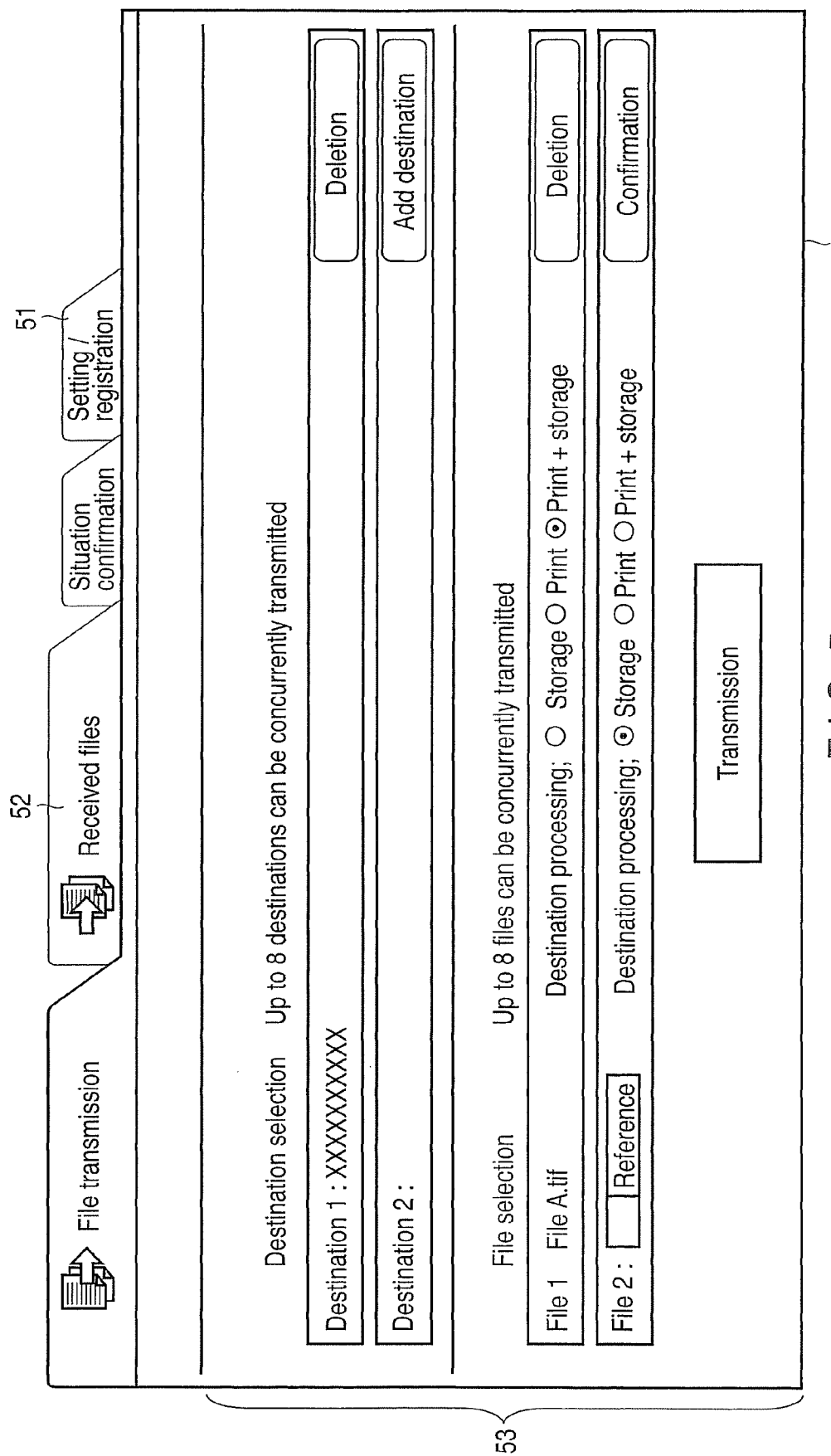
FIG. 5 illustrates an example of a UI screen displayed by a computer in FIG. 1.

In general, according to one embodiment, a file transfer apparatus includes a storing device, a determination unit, and a notification unit. The storage unit stores transfer information between the file transfer apparatus and a second file transfer apparatus. The determination unit determines an insufficient state when the latest value of a numerical value varying in response to a use situation of the region meets a predetermined condition. The notification unit notifies the intent to a user in response to the determination of the insufficient state by the determination unit.

Hereinafter, a file transfer apparatus according to an embodiment will be described with reference to the drawings. In addition, hereinbelow, the file transfer apparatus will be referred to as an adapter.

First Embodiment

FIG. 1 is a block diagram showing a configuration of an adapter 1 and a configuration of a communication system including this adapter 1 according to this embodiment, The communication system shown in FIG. 1 includes adapters 1, 2, 3, 4, and 5, gateways (hereinafter, referred to as G/W) 6, 7, 8, 9, and 10, multi function peripherals (hereinafter referred to as MFP) 11, 12, and 13, computers 14, 15, 16, and 17, printers 18 and 19, LANs 20, 21, 22, 23, and 24, and an NGN 25.

The adapter 1, the G/W 6, the MFP 11, and the computer 14 are connected to the LAN 20. The adapter 1 performs processing that allows the MFP 11 and the computer 14 to communicate with each other via the NGN 25.

The adapter 2, the G/W 7, the MFP 12, and the computer 15 are connected to the LAN 21. The adapter 2 performs processing that allows the MFP 12 and the computer 15 to communicate with each other via the NGN 25. The printer 18 is connected to the computer 15.

The adapter 3, the G/W 8, and the computer 16 are connected to the LAN 22. The adapter 3 performs processing that allows the computer 16 to communicate via the NGN 25.

The adapter 4, the G/W 9, and the MFP 13 are connected to the LAN 23. The adapter 4 performs processing that allows the MFP 13 to communicate via the NGN 25.

The adapter 5, the G/W 10, the computer 17, and the printer 19 are connected to the LAN 24. The adapter 5 performs processing that allows the computer 17 to communicate via the NGN 25.

The G/Ws 6, 7, 8, 9, and 10 are connected to the NGN 25 in addition to the LANs 20, 21, 22, 23, and 24. The G/Ws 6, 7, 8, 9, and 10 perform various kinds of known processes to match the difference in various conditions between the LANs 20, 21, 22, 23, and 24 and the NGN 25 and make it possible for the adapter 1 to communicate via the NGN 25.

The MFPs 11, 12, and 13 and the computers 14, 15, 16 and 17 function as terminals which acquire or process a computer file (hereinafter, referred to as a file) transferred via the NGN 25 by the adapters 1, 2, 3, 4, and 5. Each of the MFPs 11, 12, and 13 is provided with a print device installed therein and functions as a printer which prints an image in response to the request from the adapters 1, 2, 3, 4, and 5.

The printer 18 prints an image in response to the request from the computer 15.

The printer 19 prints an image in response to the request from the computer 17 and the adapter 5.

In the NGN 25, an audio mode, a video mode, and an application mode can be selectively used. The audio mode is a mode for performing audio communication. The video mode is a mode for performing video communication. The application mode is a mode for delivering arbitrary digital data at a high speed.

The adapter 1 includes a LAN interface (hereinafter, referred to as I/F) 1a, a protocol processor 1b, a storing device 1c, and a controller 1d. These parts are connected to a bus 1e.

The I/F 1a performs various kinds of known processes for exchanging data with the G/W 2, the MFP 11, and the computer 14 via the LAN 20.

The protocol processor 1b performs processing for executing a protocol (RFC 3261, for example) defined for the communication in the NGN 25.

The storing device 1c stores various kinds of data. A known device such as a semiconductor memory, a hard disk drive, or the like can be arbitrarily applied to the storing device 1c.

The controller 1d controls the respective parts of the adapter 1 as will be described later.

Each of the adapters 2, 3, 4, and 5 may have the same configuration as that of the adapter 1 or a different configuration from that of the adapter 1.

Next, an operation of the adapter 1 will be described.

The controller 1d uses a part of a storing region of a storing device 1c as a transmission buffer and uses another part thereof as a reception buffer, respectively.

The transmission buffer stores a sending file. The sending file is scan data obtained by scanning a document by the MFP 11, a file that is held by the computer 14 or the like. The controller 1d provides the scan data transmitted from the MFP 11 via the LAN 20 to the storing device 1c via the I/F 1a and the bus 1e, and stores the scan data in the transmission buffer as a sending file. The controller 1d provides the file transmitted from the computer 14 via the LAN 20 to the storing device 1c via the I/F 1a and the bus 1e, and stores the file in the transmission buffer as a sending file.

In addition, when a designation address is designated from the MFP 11 or the computer 14, the controller 1d manages the sending file in connection with the designation address. Furthermore, when a transmission box is designated by the MFP 11 or the computer 14, the controller 1d stores the sending file in a transmission box is physically or logically provided in the transmission buffer.

Moreover, when a plurality of files having a hierarchical structure is transferred from the MFP 11 or the computer 14, the controller 1d stores the plurality of files in the transmission buffer while maintaining the hierarchical structure.

In regard to the plurality of sending files having the hierarchical structure, the controller 1d converts the whole folder including all of the plurality of sending files into a zip file format (hereinafter, referred to as zip). Furthermore, in regard to the sending file that requires the transmission having a password, the whole folder including the sending file and the additional information is converted into a zip. In addition, when converting the sending file into the zip, the controller 1d compresses the sending file using a suitable compression algorithm. In this manner, when processing the sending file, the controller 1d stores the sending file after processing in the transmission buffer independently of the sending file before processing. Thus, an free region having a size of about 1 to 2.5 times the size of the sending file to be transferred from the MFP 11 or the computer 14 is required in the transmission buffer.

The controller 1d includes a non-processed sending file or the sending file processed as above, creates transfer information based on the standard of the NGN 25, and sends the transfer information to the NGN 25. Specifically, the controller 1d instructs the protocol processing portion 1b to transfer the transfer information to the designation address associated with the sending file or the designation address associated with the transmission box with the sending file stored therein in advance. The protocol processing portion 1b receives the instruction and transfers the transfer information to the designation address in response to the protocol of the RFC 3261 and the like. At this time, the transfer information is sent to the NGN 25 via the I/F 1a, the LAN 20, and the G/W 6. At this time, the controller 1d stores the sending file in the transmission buffer, until at least the transmission completion of the transfer information can be confirmed. Moreover, when the transmission completion of the transfer information can be confirmed, and if the deletion from the transmission buffer is permitted, the sending file is deleted from the transmission buffer.

Meanwhile, the transfer information sent to the NGN 25 by any one of the adapters 2, 3, 4, and 5 or other adapters 1 using the adapter as the designation is provided to the adapter 1 via the G/W 6 and the LAN 20. Then, the adapter 1 takes the file out of the transfer information and stores the file in the reception buffer as a received file. When the received file is the zip, the controller 1d releases the received file. Moreover, the received file, in which the zip is released, is stored in the reception buffer independently of the received file of the zip state. Thus, an free region of several multiples of the size of the transfer information to be transferred from the NGN 25 is required in the reception buffer.

The controller 1d selects the MFP 11 or the computer 14 according to a predetermined rule and transfers the received file. At this time, the controller 1d stores the received file in the reception butter, until it can be confirmed that the received file is correctly received by the MFP 11 or the computer 14. Thus, correct reception can be confirmed, and if the deletion from the reception buffer is permitted, the received file is deleted from the reception buffer.

The above is a basic motion of the adapter 1, but a plurality of files is stored in the transmission buffer and the reception buffer during such a motion, respectively. Furthermore, the size of each file also varies. Thus, the remaining capacities of each of the transmission buffer and the reception buffer are variously changed.

Thus, the controller 1d starts the management processing shown in FIG. 2 for each predetermined timing. The timing of starting the management processing may be arbitrary, but, for example, the timing is considered to be the timing whenever a certain amount of time elapses or whenever a phenomenon becoming a cause, by which the remaining capacity of the transmission buffer or the reception buffer is changed, occurs.

In Act Aa1, the controller 1d confirms whether or not the remaining capacity (hereinafter, referred to as a remaining capacity RC1) of the transmission buffer is equal to or less than a predetermined threshold value TH1. Herein, when the determination is NO, the controller 1d proceeds from Act Aa1 to Act Aa2.

In Act Aa2, the controller 1d sets a first alarm flag off. Then, the first alarm flag is in an off state when the remaining capacity of the transmission buffer is greater than the threshold value TH1.

Meanwhile, if the determination is YES in Act Aa1, the controller 1d proceeds from Act Aa1 to Act Aa3.

In Act Aa3, the controller 1d confirms whether or not the first alarm flag is set off. Herein, if the determination is YES, the controller 1d proceeds from Act Aa3 to Act Aa4.

In Act Aa4, the controller 1d sets the first alarm flag on. Then, the first alarm flag is in an off state when the remaining capacity of the transmission buffer is equal to or less than the threshold value TH1.

In Act Aa5, the controller 1d updates error log data. The error log data is the data that indicates history of errors concerning the motion of the adapter 1, and is stored in the storing device 1c. Specifically, in Act Aa5, the controller 1d adds a data record, which is associated with an error code indicating that the remaining capacity of the transmission buffer are reduced, the current time and the like, to the error log data.

In Act Aa6, the controller 1d transmits the alarm mail by setting a predetermined notification address as a designation. The notification address may be arbitrarily defined but typically becomes an address allocated to a manager of the adapter 1.

The alarm mail is an electronic mail including a message of a content notifying that the remaining capacity of the transmission buffer is low. FIG. 3 illustrates an example of an alarm mail that is transmitted in Act Aa6.

If the transmission of the alarm mail is finished, the controller 1d proceeds to Act Aa7. When the determination is NO in Act Aa3, or when Act Aa6 is finished, the controller 1d proceeds to Act Aa7 without performing Act Aa4 to Act Aa6 from each Act.

In Act Aa7, the controller 1d confirms whether or not the remaining capacity (hereinafter, referred to as a remaining capacity RC2) of the reception buffer is equal to or less than a predetermined threshold value TH2. Herein, when the determination is NO, the controller 1d proceeds from Act Aa7 to Act Aa8.

In Act Aa8, the controller 1d sets a second alarm flag off. Then, the second alarm flag is in an off state when the remaining capacity of the reception buffer is greater than the threshold value TH2.

Meanwhile, if the determination is YES in Act Aa7, the controller 1d proceeds from Act Aa7 to Act Aa9.

In Act Aa9, the controller 1d confirms whether or not the second alarm flag is set off. Herein, if the determination is YES, the controller 1d proceeds from Act Aa9 to Act Aa10.

In Act Aa10, the controller 1d sets the second alarm flag on. Then, the second alarm flag is in an off state when the remaining capacity of the reception buffer is equal to or less than the threshold value TH2.

In Act Aa11, the controller 1d updates error log data. Specifically, the controller 1d adds a data record, which was associated with an error code indicating that remaining capacity of the reception buffer are reduced, the current time and the like to the error log data.

In Act Aa12, the controller 1d transmits the alarm mail by setting a notification address as a designation.

The alarm mail is an electronic mail including a message of a content notifying that the remaining capacity of the reception buffer is low. FIG. 4 illustrates an example of an alarm mail that is transmitted in Act Aa12.

If the transmission of the alarm mail is finished, the controller 1d finishes the management processing shown in FIG. 2. When the determination is NO in Act Aa9, or when Act Aa8 is finished, the controller 1d finishes the management processing shown in FIG. 2 without performing Act Aa10 to Act Aa12 from each Act.

Incidentally, upon receiving the request of the file transmission from the computer 14, the controller 1d provides the data, which indicates a user interface screen (hereinafter, referred to as a UI screen) for designating the condition concerning the file transmission to an operator of the computer 14, to the computer 14. Then, the computer 14 displays the UI screen. Furthermore, the computer 14 notifies the condition designated by the operator according to the UI screen to the adapter 1. The data indicating the UI screen is typically a hypertext markup language (HTML) file. Moreover, the computer 14 displays the UI screen by a general browser function.

FIGS. 5 and 6 illustrate the UI screen.

The UI screen 50 shown in FIG. 5 is a screen when the first alarm flag is set off. The UI screen 60 shown in FIG. 6 is a screen when the first alarm flag is set on.

The UI screen 60 is one in which a message 61 is added to the UI screen 50. The message 61 warns an operator of the computer 14 that the remaining capacity of the transmission buffer is low.

The UI screens 50 and 60 include a tab 51. When the tab 51 clicks, the click is notified from the computer 14 to the adapter 1. Thus, the controller 1d provides the data indicating the UI screen 70 shown in FIG. 7 to the computer 14. Then, the computer 14 displays the UI screen 70. However, the initial UI screen 70 does not include a character string to be indicated in the regions 71 and 72 but includes a button 73.

Figure 7:
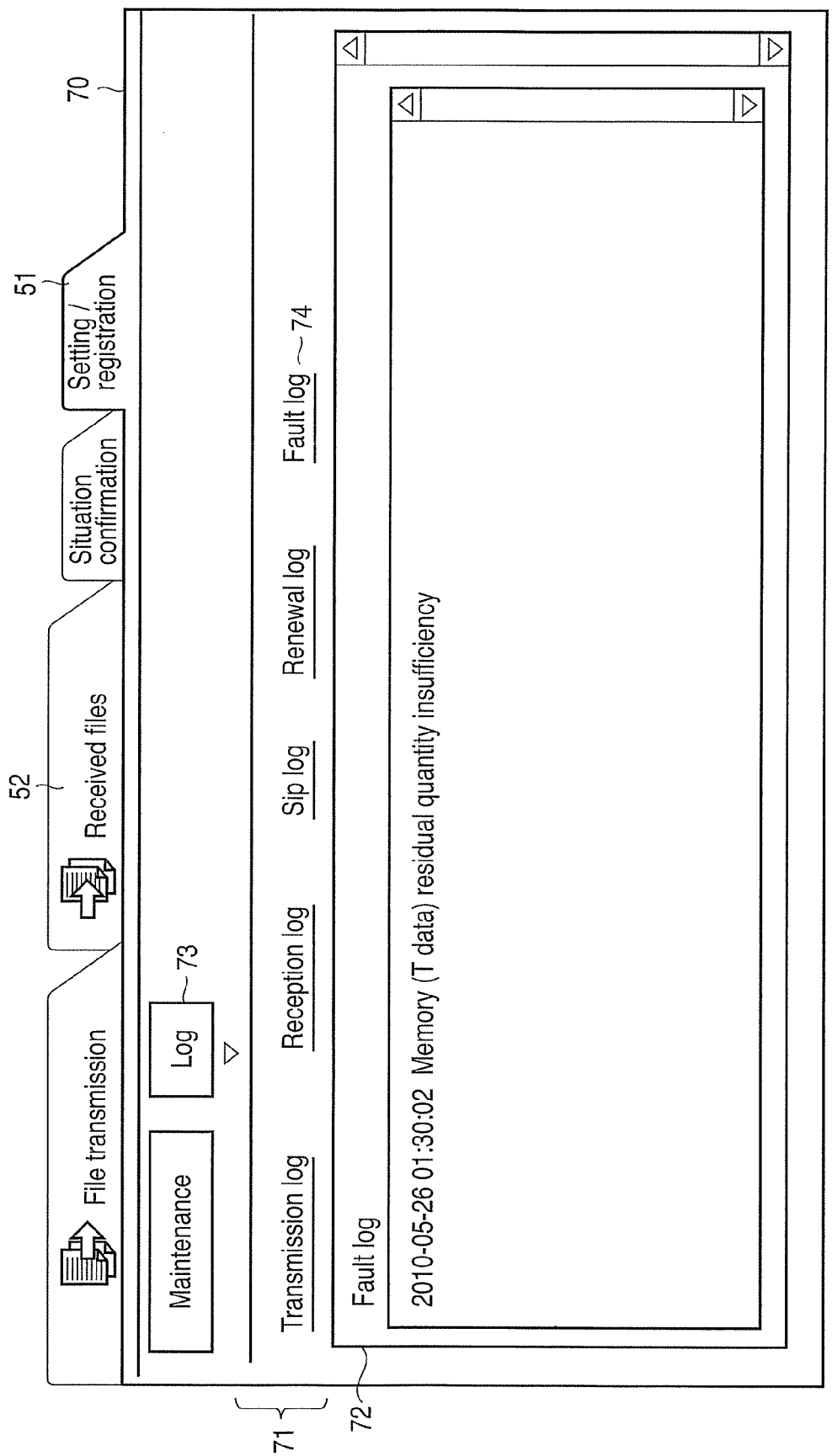
FIG. 7 illustrates an example of a UI screen displayed by a computer in FIG. 1.

In response to the clicking of the button 73, the controller 1d updates the UI screen 70 so as to include the character string to be indicated in the region 71. Moreover, in response to the clicking of the character string 74, the controller 1d updates the UI screen 70 so as to include the character string to be indicated in the region 72. The controller 1d creates the character string to be indicated in the region 72 based on the error log data. Thus, if the data record added in Act Aa5 or Act Aa11 is included in the error log data, the content of the error indicated by the data record is displayed in the UI screen 70, for example, as shown in FIG. 7.

In addition, the UI screens 50, 60, and 70 include a tab 52. When the tab 52 clicks, the clicking is notified by the computer 14 to the adapter 1. As a result, the controller 1d creates the UI screen including a list image in regard to the file that is stored in the reception buffer. For example, the UI screen is a screen in which an image in the region 53 in the UI screen 50 is substituted for the list image when the second alarm flag is set off, and the UI screen is a screen in which an image in the region 62 in the UI screen 60 is substituted for the list image and a message 61 is substituted for one which warns to an operator of the computer 14 that the remaining capacity of the reception buffer is low when the second alarm flag is set on. The message is, for example, that "reception data region is insufficient".

If the MFP 11 has a browser function, various kinds of UI screens can be displayed on the MFP 11.

In addition, the threshold value TH1 may be an arbitrary numerical value other than 0 that is smaller than the size of the region allocated to the transmission buffer in the storing device 1c. The threshold value TH2 may be an arbitrary numerical value other than 0 that is smaller than the size of the region allocated to the transmission buffer in the storing device 1c. For example, it is assumed that the threshold value TH1 is 100 MB and the threshold value TH2 is 200 MB. The threshold values TH1, TH2 may be fixed to values defined by a manufacturer of the adapter 1, and may be values designated by a user of the adapter 1.

In this manner, according to the first embodiment, when the remaining capacity of the transmission buffer is reduced to the value equal to or less than the threshold value TH1, or when the remaining capacity of the reception buffer is reduced to the value equal to or less than the threshold value TH2, the reduction is notified to the notification that was predetermined by the alarm mail. Thus, a manager and the like of the notification can rapidly recognize that the remaining capacity of the transmission buffer or the reception buffer is reduced. Moreover, a manager and the like considers a suitable measure, whereby it is possible to prevent a new transmission or reception for the capacity insufficiency of the transmission buffer or the reception buffer from being performed. In addition, the aforementioned measure is, for example, to delete an unnecessary file stored in the transmission buffer or the reception buffer.

Furthermore, according to the first embodiment, when the remaining capacity of the transmission buffer is reduced to the value equal to or less than the threshold value TH1, or when the remaining capacity of the reception buffer is reduced to the value equal to or less than the threshold value TH2, the reduction is recorded in the error log. Moreover, the error log is displayed on the computer 14 depending on the request of an operator of the computer 14. Thus, an operator of the computer 14 is capable of understanding past trends concerning the reduction of the remaining capacity of the transmission buffer and the reception buffer. Moreover, an operator considers a suitable measure, whereby it is possible to prevent a situation in which a new transmission or reception for the capacity insufficiency of the transmission buffer is not performed. In addition, for example, the aforementioned measure is to delete unnecessary files stored in the transmission buffer or the reception buffer before the timing when the remaining capacity of the transmission buffer or the reception buffer is likely to be reduced, or avoid the transmission during a time band in which the remaining capacity of the transmission buffer is likely to be reduced.

Furthermore, according to the first embodiment, the reduction in remaining capacity of the transmission buffer to the value equal to or less than the threshold value TH1 is displayed on the UI screen for designating the condition concerning the file transmission, and the reduction in remaining capacity of the reception buffer to the value equal to or less than the threshold value TH2 is displayed on the UI screen including the list image of the received file. Thus, an operator, who performs the transmission of the file or treats the received file to see the UI screen, can easily recognize that the remaining capacity of the transmission buffer or the reception buffer is reduced to the value equal to or less than the threshold value TH1 or the threshold value TH2. Moreover, an operator considers a suitable measure, whereby it is possible to prevent a situation in which a new transmission or reception for the capacity insufficiency of the transmission buffer or the reception buffer is not performed. In addition, for example, the aforementioned measure is to delete unnecessary files stored in the transmission buffer or the reception buffer, or to delay the execution of a new transmission.

Second Embodiment

Since the configuration of the adapter 1 according to the second embodiment and the configuration of the communication system including the adapter 1 are identical to those of the first embodiment, the detailed descriptions thereof will be omitted.

The second embodiment differs from the first embodiment in that the controller 1*d* carries out processing described later in addition to the same processing as the first embodiment.

Figure 8:
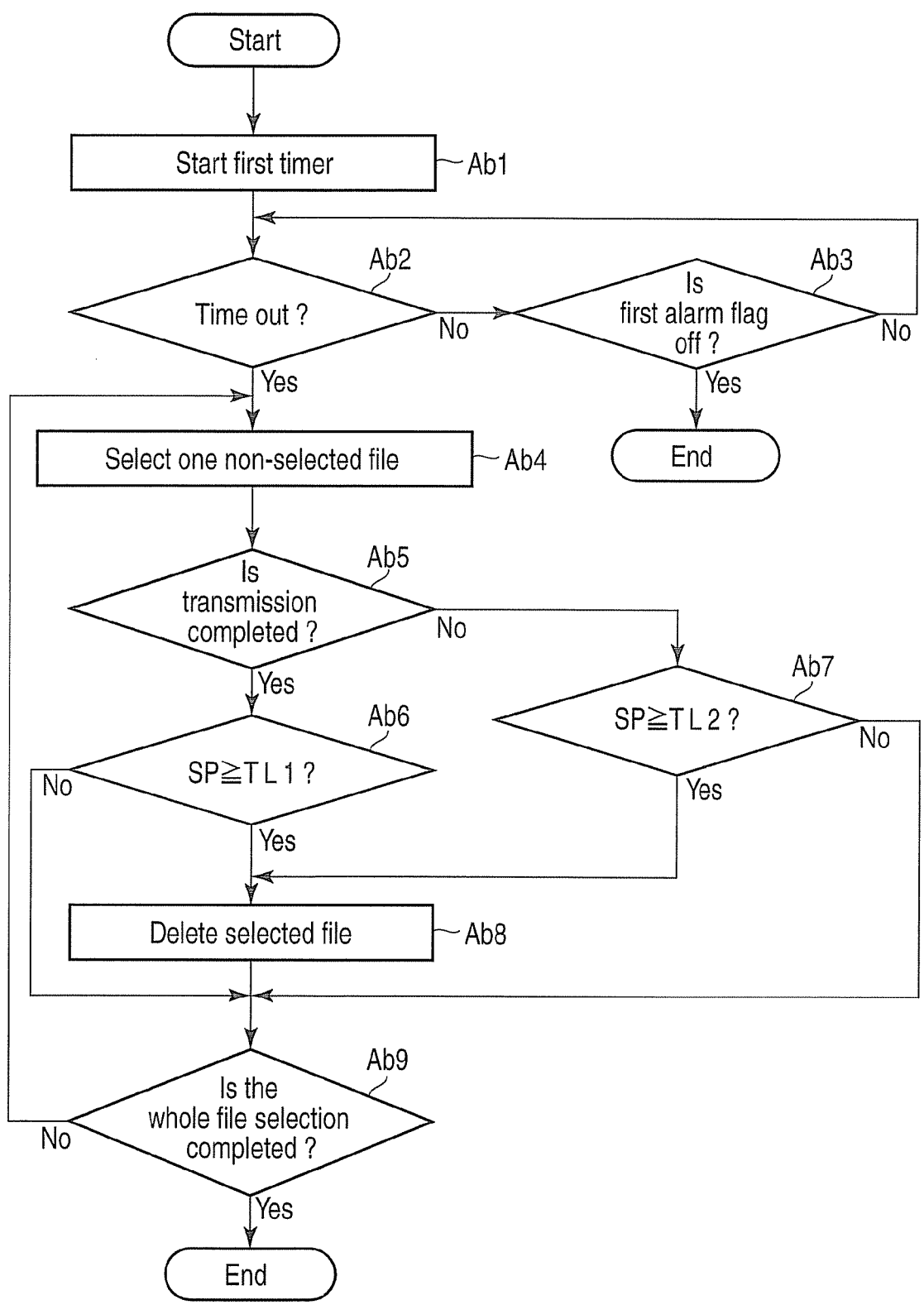
FIG. 8 illustrates a flow chart of processing in a second embodiment according to a controller in FIG. 1.

The controller 1*d* starts the processing shown in FIG. 8 by a task different from FIG. 2 depending on the situation that sets the first alarm flag on in Act Aa4 in FIG. 2.

In Act Ab1, the controller 1*d* starts a first timer. The first timer measures the elapsed time from the start up to a predetermined standby time ST1. The standby time ST1 may be arbitrary, but is typically about several minutes. The standby time ST1 may be fixed to a value defined by a manufacturer by the adapter 1 and may be a value designated by a user of the adapter 1. For example, the first timer can be realized as processing of the controller 1*d* of a task different from other processing.

In Act Ab2 and Act Ab3, the controller 1*d* waits for the first timer to be time-out or for the first alarm flag to be off. If the first alarm flag becomes off before the first timer becomes time-out, the controller 1*d* determines YES in Act Ab3, and finishes the processing shown in FIG. 8.

When the state, in which the first alarm flag is on, continues over the standby time ST1, since the first timer is time-out, the controller 1*d* determines YES in Act Ab2. Moreover, in this case, the controller 1*d* proceeds from Act Ab2 to Act Ab4.

In Act Ab4, the controller 1*d* selects one unselected file after starting the processing shown in FIG. 8 among the files hitherto stored in the transmission buffer. In addition, hereinbelow, the file selected herein is referred to as a selected file.

In Act Ab5, the controller 1*d* confirms whether or not the transmission of the selected file is finished. If the determination is YES in Act Ab5, the controller 1*d* proceeds to Act Ab6, and if the determination is NO, the controller 1*d* proceeds to Act Ab7.

In Act Ab6, the controller 1*d* decides whether or not a period (hereinafter, referred to as a storage period SP) of preserving the selected file in the transmission buffer is equal to or greater than a predetermined time limit TL1. Furthermore, in Act Ab7, the controller 1*d* decides whether or not storage period SP is equal to or greater than a predetermined time limit TL2. Moreover, if any one of Act Ab6 and Act Ab7 is determined to be YES, the controller 1*d* proceeds to Act Ab8. Although the time limit TL1 and the time limit TL2 may be arbitrarily defined, respectively, typically, the time limit TL2 is defined to be longer than the time limit TL1. As an example, the time limit TL1 is one day, and the time limit TL2 is 30 days. The time limits TL1, TL2 may be fixed to values defined by a manufacturer of the adapter 1 and may be values designated by a user of the adapter 1.

In Act Ab8, the controller 1*d* deletes the selected file from the transmission buffer. That is, the controller 1*d* deletes the file in which the transmission is finished and the storage period SP thereof is past the time limit TL1, and the file in which the transmission is not finished but the storage period SP thereof is past the time limit TL2, from the transmission buffer.

If the deletion of the selected file is finished, the controller 1*d* proceeds to Act Ab9. When the determination in Act Ab6 or Act Ab7 is NO, the controller 1*d* proceeds to Act Ab9 without executing Act Ab8. That is, the controller 1*d* leaves the file, which does not meet any one of the aforementioned conditions, in the reception buffer.

In Act Ab9, the controller 1*d* confirms whether or not all the files stored in the transmission buffer are completely selected. If the determination in Act Ab9 is NO, the controller 1*d* repeats the processing after Act Ab4. Moreover, if the determination in Act Ab9 is YES, the controller 1*d* finishes the processing of FIG. 8.

Figure 9:
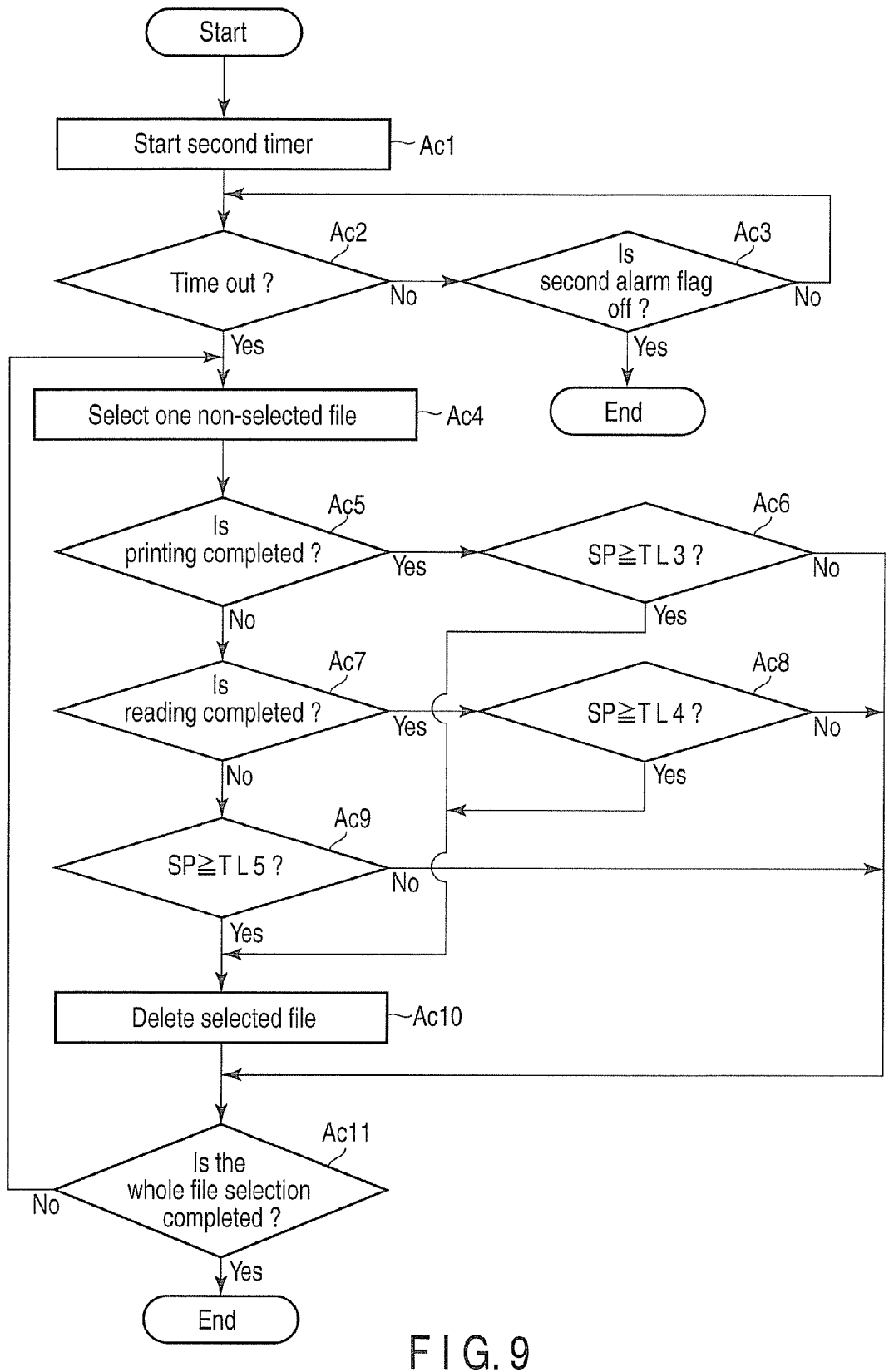
FIG. 9 illustrates a flow chart of processing in a second embodiment according to a controller in FIG. 1.

Meanwhile, the controller 1*d* starts the processing shown in FIG. 9 by a task different from FIGS. 2 and 8 depending on the situation that the second alarm flag is set on in Act Aa10 in FIG. 2.

In Act Ac1, the controller 1*d* starts a second timer. The second timer measures the elapsed time from the start up to a predetermined standby time ST2. The standby time ST2 may be arbitrary, but is typically about several minutes. The standby time ST2 may be fixed to a value defined by a manufacturer by the adapter 1 and may be a value designated by a user of the adapter 1. For example, the second timer can be realized as processing of the controller 1*d* of a task different from other processing.

In Act Ac2 and Act Ac3, the controller 1*d* waits for the second timer to be time-out or for the second alarm flag to be off. If the second alarm flag becomes off before the second timer becomes time-out, the controller 1*d* determines YES in Act Ac3, and finishes the processing shown in FIG. 9.

When the state, in which the second alarm flag is on, continues over the standby time ST2, since the second timer is time-out, the controller 1d determines YES in Act Ac2. Moreover, in this case, the controller 1d proceeds from Act Ac2 to Act Ac4.

In Act Ac4, the controller 1d selects one unselected file after starting the processing shown in FIG. 9 among the files hitherto stored in the transmission buffer. In addition, hereinbelow, the file selected herein is referred to as a selected file.

In Act Ac5, the controller 1d confirms whether or not the printing of the selected file is finished. If the determination is YES in Act Ac5, the controller 1d proceeds to Act Ac6.

In Act Ac6, the controller 1d decides whether or not a period (hereinafter, referred to as a storage period SP) of preserving the selected file in the transmission buffer is equal to or greater than a predetermined time limit TL3. Moreover, if the determination in Act Ac6 is YES, the controller 1d proceeds to Act Ac10. The time limit TL3 may be arbitrarily defined. As an example, the time limit TL3 is one day. The time limit TL3 may be fixed to a value defined by a manufacturer of the adapter 1 and may be a value designated by a user of the adapter 1.

If the determination in Act Ac5 is NO because the selected file is not printed, the controller 1d proceeds to Act Ac7.

In Act Ac7, the controller 1d confirms whether or not the selected file is completely read. If the determination in Act Ac7 is YES, the controller 1d proceeds to Act Ac8.

In Act Ab8, the controller 1d decides whether or not the storage period SP of the selected file is equal to or greater than a predetermined time limit TL4. Moreover, if the determination in Act Ac8 is YES, the controller 1d proceeds to Act Ac10. Although the time limit TL4 may be arbitrarily defined, typically, the time limit TL4 is defined to be longer than the time limit TL3. As an example, the time limit TL4 is 30 days. The time limit TL4 may be fixed to a value defined by a manufacturer of the adapter 1 and may be a value designated by a user of the adapter 1.

If the determination in Act Ac7 is NO because the selected file is not read, the controller 1d proceeds to Act Ac9.

In Act Ac9, the controller 1d decides whether or not the storage period SP of the selected file is equal to or greater than a predetermined time limit TL5. Moreover, if the determination in Act Ac9 is YES, the controller 1d proceeds to Act Ac10. Although the time limit TL5 may be arbitrarily defined, typically, the time limit TL5 is defined to be longer than the third and time limit TL4s. As an example, the time limit TL5 is 90 days. The time limit TL5 may be fixed to a value defined by a manufacturer of the adapter 1 and may be a value designated by a user of the adapter 1.

In Act Ac10, the controller 1d deletes the selected file from the reception buffer. That is, the controller 1d deletes the file in which the printing is finished and the storage period SP thereof is past the time limit TL3, the file in which the printing is not performed and the reading is finished, and the preservation time is past the time limit TL4, and the file in which none of the printing and the reading is performed but the storage period SP thereof is past the time limit TL5, from the reception buffer.

If the deletion of the selected file is finished, the controller 1d proceeds to Act Ac11. When the determination in Act Ac6, Act Ac8 or Act Ac9 is NO, the controller 1d proceeds to Act Ac11 without executing Act Ac10. That is, the controller 1d leaves the file, which does not meet any one of the aforementioned conditions, in the reception buffer.

In Act Ac11, the controller 1d confirms whether or not all the files stored in the reception buffer are completely selected. If the determination in Act Ac11 is NO, the controller 1d repeats the processing after Act Ac4. Moreover, if the determination in Act Ac11 is YES, the controller 1d finishes the processing of FIG. 9.

As described above, according to the second embodiment, if the first alarm flag sets to off during a certain time after the first alarm flag is set on, the file, which meets a certain condition among the files stored in the transmission buffer, is automatically deleted. Furthermore, if the second alarm flag sets to off during a certain time after the second alarm flag is set on, the file, which meets a certain condition among the files stored in the reception buffer, is automatically deleted. Thus, when the remaining capacity of the transmission buffer or the reception buffer is reduced, the expansion of the remaining capacity is automatically performed. Moreover, according to the second embodiment, since the file is not automatically deleted until a certain amount of time elapses after the first or second alarm flag is set on, a manager and the like can perform the deletion of the file in view of the necessity of each file.

According to the second embodiment, since the periods up to performing the automatic deletion depending on the state of the file is different from each other, it is possible to automatically delete the file, which is more likely to be unnecessary, and leave the file which is more likely to be necessary as much as possible.

Third Embodiment

Since the configuration of the adapter 1 according to a third embodiment and the configuration of a communication system including the adapter 1 are the same as those of the first embodiment, the detailed descriptions thereof will be omitted.

The third embodiment differs from the first embodiment in that the controller 1d carries out processing described later instead of the processing shown in FIG. 2. In addition, even in the third embodiment, the controller 1d may carry out the same processing as the second embodiment.

The controller 1d updates the history data stored in the storing device 1c for each predetermined timing.

FIG. 10 schematically illustrates an example of the content of history data.

The history data shown in FIG. 10 is one in which the usage amounts of the transmission buffer and the reception buffer for at every hour on the hour are described in regard to the current day and every one of the past 30 days. A left numerical value from "," of each column indicates the usage amount of the transmission buffer, and a right numerical value indicates the usage amount of the reception buffer. Furthermore, in FIG. 10, the usage amount indicates a ratio of the capacity of an in-use region relative to the total capacity of each buffer by percentage.

When the history data is the data as described above, the controller 1d updates the history data at every hour on the hour. Specifically, at midnight of each day, the controller 1d sets each value of the current day and the past 29 days as a value of the day before, sets a value of a column of midnight of the current day as the usage amount of the transmission buffer and the reception buffer at present time, and sets all the respective values other than midnight of the current day as null (indicted by "-" in FIG. 10). Furthermore, at the hours other than midnight, the controller 1d sets the value of the column corresponding to the current time regarding the current day as the usage amounts of the transmission buffer and the reception buffer at present time.

Figure 11:
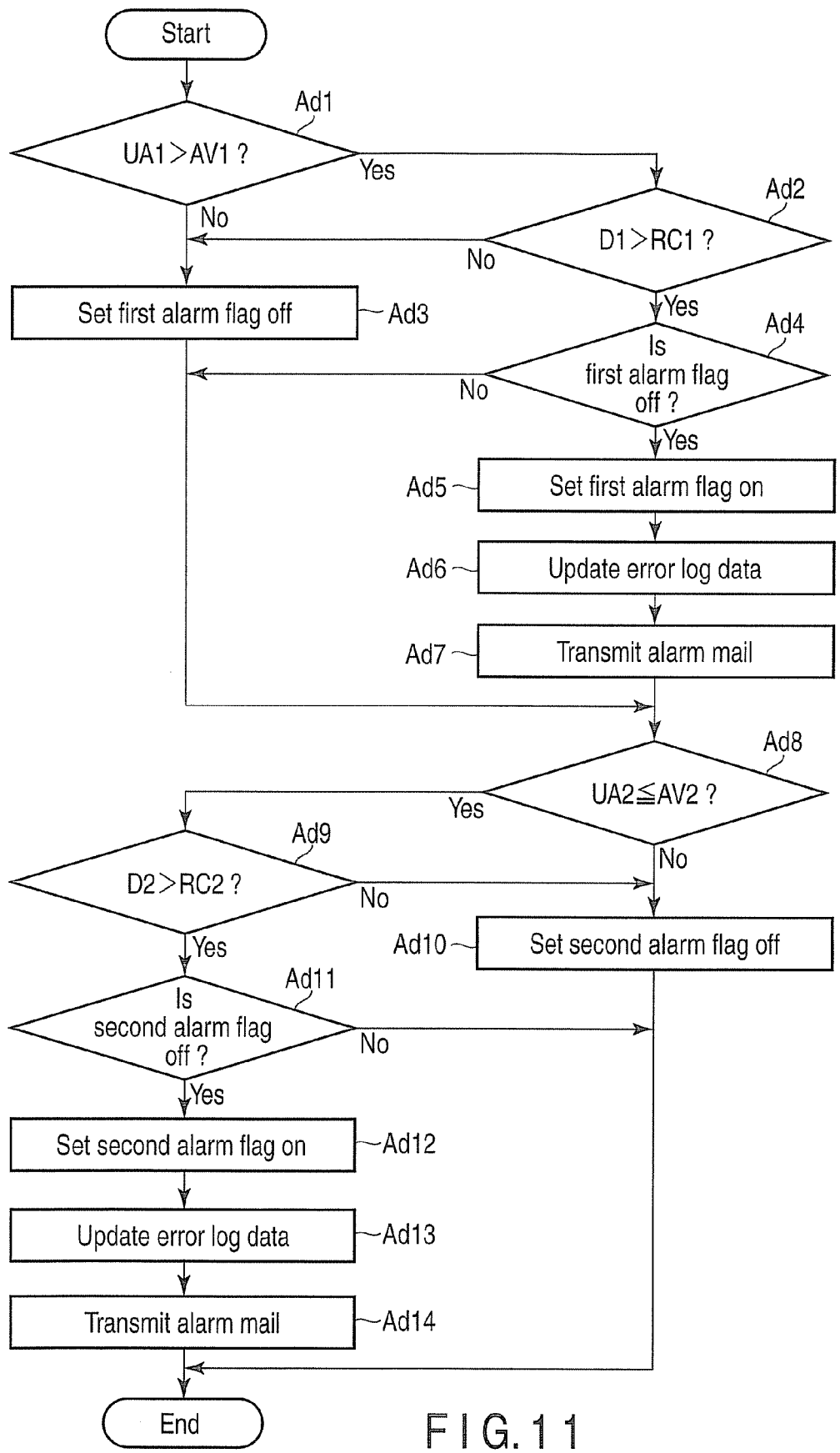
FIG. 11 illustrates a flow chart of processing in a third embodiment according to a controller in FIG. 1.

Independently of the above processing, the controller 1d starts the management processing shown in FIG. 11 for each predetermined timing. The timing of starting the management processing may be arbitrary, but, for example, it is considered that the timing is each time that a fixed time elapses, or each time that a phenomenon becoming a cause, by which the usage amount of the transmission buffer or the reception buffer is changed, occurs.

In Act Ad1, the controller $1d$ confirms whether or not the usage amount (hereinafter, referred to as a usage amount UA1) of the transmission buffer at the present time is greater than a average value AV1. The average value AV1 is an average value from the previous day to 30 days prior of the usage amount of the transmission buffer in a time division to which the present time belongs. The time division refers to a period of an hour starting from each of the hours. Moreover, the value described in the history data regarding the hour included in each time division is a usage amount concerning this time division. That is, for example, if the present time belongs to the time division of 9:00 to 9:59, the controller $1d$ obtains an average value of each value described regarding the column of 9:00 in regard to each day from the previous day to 30 days prior among the history data in the transmission buffer, and sets the average value as a average value AV1. In addition, for example, the time division sets from 8:31 to 9:30 as one time division, and can arbitrarily change the value described in the column of 9 o'clock by setting the value as the usage amount of the time division or the like. Moreover, if the determination in Act Ad1 is YES, the controller $1d$ proceeds to Act Ad2.

In Act Ad2, the controller $1d$ confirms whether or not a difference D1 is greater than the remaining capacity (hereinafter, referred to as a remaining capacity RC1) of the transmission buffer. In addition, the controller $1d$ obtains the difference D1 by subtracting the average value AV1 from the usage amount UA1. If the determination is YES, the controller $1d$ proceeds to Act Ad4. However, if the determination is NO in either one of Act Ad1 and Act Ad2, the controller $1d$ proceeds to Act Ad3.

As mentioned above, in Act Ad1 and Act Ad2, the controller $1d$ confirms whether or not the following two conditions are established, the controller $1d$ proceeds to Act Ad4 when the conditions are established, and the controller $1d$ proceeds to Act Ad3 when the conditions are not established.

(1) The usage amount of the transmission buffer at present is greater than the average amount of the usage amount for the past month of the same time division.

(2) The excess amount of the usage amount relative to the average value is greater than the remaining capacity of the present transmission buffer.

Moreover, in Act Ad3, the controller $1d$ sets the first alarm flag off. That is, if neither of the two conditions is established, the controller $1d$ determines that the remaining capacity of the transmission buffer is in a sufficient state.

On the other hand, in Act Ad4, the controller $1d$ confirms whether or not the first alarm flag is set off. If the determination is YES, the controller $1d$ proceeds to Act Ad5.

In Act Ad5, the controller $1d$ sets the first alarm flag on. That is, if both of the two conditions are established, the controller $1d$ determines that the remaining capacity of the transmission buffer is insufficient state.

In Act Ad6, the controller $1d$ updates the error log data. This is the same as Act Aa5.

In Act Ad7, the controller $1d$ transmits the alarm mail. This is the same as Act Aa6.

If the alarm mail is completely transmitted, the controller $1d$ proceeds to Act Ad8. When Act Ad3 is finished, or when the determination in Act Ad4 is NO, the controller $1d$ proceeds to Act Ad8 without performing Act Ad5 to Act Ad7 from each Act.

In Act Ad8, the controller $1d$ confirms whether or not the usage amount (hereinafter, referred to as a usage amount UA2) of the reception buffer at the present time is greater than a average value AV2. The average value AV2 is an average value from the previous day to 30 days prior of the usage amount of the reception buffer in a time division to which the present time belongs. Moreover, if the determination in Act Ad8 is YES, the controller $1d$ proceeds to Act Ad9.

In Act Ad9, the controller $1d$ confirms whether or not a difference D2 is greater than the remaining capacity (hereinafter, referred to as a remaining capacity RC2) of the reception buffer. In addition, the controller $1d$ obtains the difference D2 by subtracting the average value AV2 from the usage amount UA2. If the determination is YES, the controller $1d$ proceeds to Act Ad11. However, if the determination is NO in either one of Act Ad8 and Act Ad9, the controller $1d$ proceeds to Act Ad10.

As mentioned above, in Act Ad8 and Act Ad9, the controller $1d$ confirms whether or not the following two conditions are established, the controller $1d$ proceeds to Act Ad11 when the conditions are established, and the controller $1d$ proceeds to Act Ad10 when the conditions are not established.

(1) The usage amount of the reception buffer at present is greater than the average amount of the usage amount for the past month of the same time division.

(2) The excess amount of the usage amount relative to the average value is greater than the remaining capacity of the present reception buffer.

Moreover, in Act Ad10, the controller $1d$ sets the second alarm flag off. That is, if neither of the two conditions is established, the controller $1d$ determines that the remaining capacity of the reception buffer is in a sufficient state.

On the other hand, in Act Ad11, the controller $1d$ confirms whether or not the second alarm flag is set off. If the determination is YES, the controller $1d$ proceeds to Act Ad12.

In Act Ad12, the controller $1d$ sets the second alarm flag on. That is, if both of the two conditions are established, the controller $1d$ determines that the remaining capacity of the reception buffer is in an insufficient state.

In Act Ad13, the controller $1d$ updates the error log data. This is the same as Act Aa11.

In Act Ad14, the controller $1d$ transmits the alarm mail. This is the same as Act Aa12.

If the alarm mail is completely transmitted, the controller $1d$ finishes the processing of FIG. 11. When Act Ad10 is finished, or when the determination in Act Ad11 is NO, the controller $1d$ finishes the processing of FIG. 11 without performing Act Ad5 to Act Ad7.

As mentioned above, according to the third embodiment, the same effect as the first embodiment is achieved.

Furthermore, according to the third embodiment, since it is decided whether or not the remaining capacities of the transmission buffer and the reception buffer are insufficient in view of the use situations of the transmission buffer and the reception buffer of the past, it is possible to send the alarm at a suitable timing depending on an actual use situation.

Specifically, if the usage amount of the present transmission buffer is "60", the average value AV1 is "70", and the remaining capacity of the present transmission buffer is "40", neither of the two conditions is established, and thus the first alarm flag is set off. If the usage amount of the present transmission buffer is "60", the average value AV1 is "50", and the remaining capacity of the present transmission buffer is "40", only one condition is established, and thus the first alarm flag is set off. If the usage amount of the present transmission buffer is "60", the average value AV1 is "10", and the remaining capacity of the present transmission buffer is "40", since both of the two conditions are established, the first alarm flag is on. That is, since all of the usage amounts of the present transmission buffer are equally "60", the state of the first alarm flag is changed depending on the average value of the usage amounts for the past month.

Fourth Embodiment

Since the configuration of the adapter 1 according to a fourth embodiment and the configuration of a communication system including the adapter 1 is the same as that of the first embodiment, the detailed descriptions thereof will be omitted.

The fourth embodiment differs from the first embodiment in that the controller 1*d* carries out processing described later instead of the processing shown in FIG. 2. In addition, even in the fourth embodiment, the controller 1*d* may carry out the same processing as the second embodiment.

Similarly to the third embodiment, the controller 1*d* updates the history data stored in the storing device 1*c*.

Figure 12:
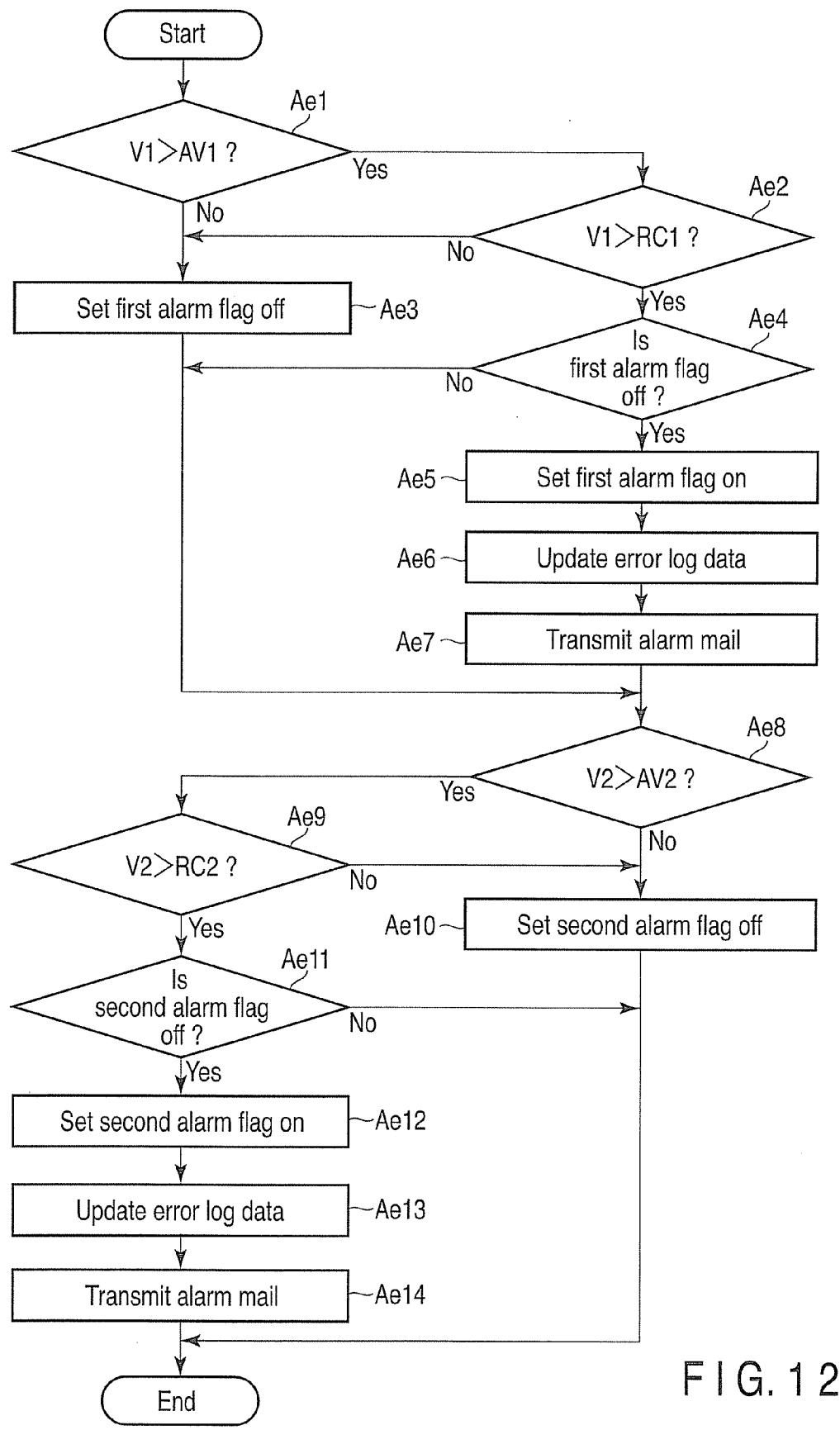
FIG. 12 illustrates a flow chart of processing in a fourth embodiment according to a controller in FIG. 1.

Furthermore, the controller 1*d* starts the management processing shown in FIG. 12 for each predetermined timing. The timing of starting the management processing may be arbitrary, but, for example, it is considered that the timing is each time a fixed time elapses, or each time a phenomenon becoming a cause, by which the usage amount of the transmission buffer or the reception buffer is changed, occurs.

In Act Ae1, the controller 1*d* confirms whether or not a variation V1 is greater than a average value AV1. Herein, the variation V1 is the variation of the usage amount of the transmission buffer at the present time relative to the usage amount of the transmission buffer in the previous time division of the time division to which the present time belongs. The average value AV1 is an average value, from the previous day to 30 days prior, of the variation. If the present time belongs to the time division of 9:00 to 9:59, the controller 1*d* obtains the variation V1 by subtracting the value described in the column of 8 o'clock of the present day regarding the transmission buffer from the value described in the column of 9 o'clock of the present day regarding the transmission buffer among the history data. Furthermore, the controller 1*d* obtains the variation by subtracting the value described in the column of 8 o'clock regarding the transmission buffer from the value described in the column of 9 o'clock regarding the transmission buffer in regard to each day from the previous day to 30 days prior, and obtains the average value AV1 as an average value of the obtained variations in regard to each day from the previous day to 30 days prior. Moreover, if the determination in Act Ae1 is YES, the controller 1*d* proceeds to Act Ae2.

In Act Ae2, the controller 1*d* confirms whether or not the variation V1 is greater than the remaining capacity RC1 of the transmission buffer. If the determination is YES, the controller 1*d* proceeds to Act Ae4. However, if the determination is NO in any one of Act Ae1 and Act Ae2, the controller 1*d* proceeds to Act Ae3.

As mentioned above, in Act Ae1 and Act Ae2, the controller 1*d* confirms whether or not the following two conditions are both established, the controller 1*d* proceeds to Act Ae4 when the conditions are established, and the controller 1*d* proceeds to Act Ae3 when the conditions are not established.

(1) The variation of the usage amount of the transmission buffer in the immediate one to two hours before of the present day is greater than the average value for the past month of the variation of the usage amount of the transmission buffer from the previous time division of the present time division to the present time division.

(2) The excess amount of the usage amount relative to the average value is greater than the remaining capacity of the present transmission buffer.

Moreover, in Act Ae3, the controller 1*d* sets the first alarm flag off. That is, if neither of the two conditions is established, the controller 1*d* determines that the remaining capacity of the transmission buffer is in a sufficient state.

On the other hand, in Act Ae4, the controller 1*d* confirms whether or not the first alarm flag is set off. If the determination is YES, the controller 1*d* proceeds to Act Ae5.

In Act Ae5, the controller 1*d* sets the first alarm flag on. That is, if both of the two conditions are established, the controller 1*d* determines that the remaining capacity of the transmission buffer is in an insufficient state.

In Act Ae6, the controller 1*d* updates the error log data. This is the same as Act Aa5.

In Act Ae7, the controller 1*d* transmits the alarm mail. This is the same as Act Aa6.

If the alarm mail is completely transmitted, the controller 1*d* proceeds to Act Ae8. When Act Ae3 is finished, or when the determination in Act Ae4 is NO, the controller 1*d* proceeds to Act Ae8 without performing Act Ae5 to Act Ae7 from each Act.

In Act Ae8, the controller 1*d* confirms whether or not a variation V2 is greater than a average value AV2. Herein, the variation V2 is a variation of the usage amount of the reception buffer at the present time relative to the usage amount of the reception buffer in the previous time division of the time division to which the present time belongs. The average value AV2 is an average value from the previous day to 30 days prior of the variation. If the present time belongs to the time division of 9:00 to 9:59, the controller 1*d* obtains the variation V2 by subtracting the value described in the column of 8 o'clock of the present day regarding the reception buffer from the value described in the column of 9 o'clock of the present day regarding the reception buffer among the history data. Furthermore, the controller 1*d* obtains the variation by subtracting the value described in the column of 8 o'clock regarding the transmission buffer from the value described in the column of 9 o'clock regarding the reception buffer in regard to each day from the previous day to 30 days prior, and obtains the average value AV2 as an average value of the obtained variations in regard to each day from the previous day to 30 days prior. Moreover, if the determination in Act Ae8 is YES, the controller 1*d* proceeds to Act Ae9.

In Act Ae9, the controller 1*d* confirms whether or not the variation V2 is greater than the remaining capacity RC2 of the reception buffer. If the determination is YES, the controller 1*d* proceeds to Act Ae11. However, if the determination is NO in any one of Act Ae8 and Act Ae9, the controller 1*d* proceeds to Act Ae10.

As mentioned above, in Act Ae8 and Act Ae9, the controller 1*d* confirms whether or not the following two conditions are both established, the controller 1*d* proceeds to Act Ae11 when the conditions are established, and the controller 1*d* proceeds to Act Ae10 when the conditions are not established.

(1) The variation of the usage amount of the reception buffer in the immediate one to two hours before of the present day is greater than the average value for the past month of the variation of the usage amount of the reception buffer from the previous time division of the present time division to the present time division.

(2) The excess amount of the usage amount relative to the average value is greater than the remaining capacity of the present reception buffer.

Moreover, in Act Ae10, the controller 1d sets the second alarm flag off. That is, if neither of the two conditions is established, the controller 1d determines that the remaining capacity of the reception buffer is in a sufficient state.

On the other hand, in Act Ae11, the controller 1d confirms whether or not the second alarm flag is set off. If the determination is YES, the controller 1d proceeds to Act Ae12.

In Act Ae12, the controller 1d sets the second alarm flag on. That is, if both of the two conditions are established, the controller 1d determines that the remaining capacity of the reception buffer is in an insufficient state.

In Act Ae13, the controller 1d updates the error log data. This is the same as Act Aa11.

In Act Ae14, the controller 1d transmits the alarm mail. This is the same as Act Aa12.

If the alarm mail is completely transmitted, the controller 1d finishes the processing of FIG. 11. When Act Ae10 is finished, or when the determination in Act Ae11 is NO, the controller 1d finishes the processing of FIG. 12 without performing Act Ae5 to Act Ae7.

As mentioned above, according to the fourth embodiment, the same effect as the first embodiment is achieved.

Furthermore, according to the fourth embodiment, since it is decided whether or not the remaining capacities of the transmission buffer and the reception buffer are insufficient in view of the use situations of the transmission buffer and the reception buffer of the past, it is possible to send the alarm at a suitable timing depending on an actual use situation.

Specifically, if the usage amount of the present transmission buffer is "60", the variation V1 is "10", the average value AV1 is "20", and the remaining capacity of the present transmission buffer is "40", neither of the two conditions is established, and thus the first alarm flag is set off. If the usage amount of the present transmission buffer is "60", the variation V1 is "30", the average value AV1 is "40", and the remaining capacity of the present transmission buffer is "40", only one condition is established, and thus the first alarm flag is set off. If the usage amount of the present transmission buffer is "60", the variation V1 is "50", the average value AV1 is "30", and the remaining capacity of the present transmission buffer is "40", since both of the two conditions are established, the first alarm flag is on. That is, since all of the usage amounts of the present transmission buffer are equally "60", the state of the first alarm flag is changed depending on the average value of the usage amount for the past month.

The above respective embodiments can carry out various modifications as below.

In each embodiment, the function of the adapter 1 may be built in the MFP or the computer. Furthermore, it is also possible to realize an apparatus including both of the function of the adapter 1 and the function of the G/W.

In the respective embodiments, the transmission buffer and the reception buffer may be a common buffer without being separately provided. Moreover, in this case, the same processing as that concerning the transmission buffer in each embodiment is performed on the common buffer, and the processing concerning the reception butter is omitted.

Only one of the processing concerning the transmission buffer and the processing concerning the reception buffer may be performed in each embodiment.

One or two of the log recording, the transmission of the alarm mail, and the alarm display on the operation screen may not be performed in each embodiment.

In each embodiment, the controller 1d may notify the first and second alarm flag to the MFP 11. Then, in the MFP 11, it is possible to display the alarm display on the operation screen and the like, based on the alarm flag of the notified first and second alarm flags.

In the second embodiment, irrespectively of the state of the first and second alarm flags, the condition for determining the file becoming a deletion target may be arbitrary. For example, the file in which the transmission is not completed or the file in which neither the printing nor the reading is performed may not be automatically deleted.

In the second embodiment, regardless of the status of the first and second alarm flags, the processing shown in FIGS. 8 and 9 may be performed for each timing such as, for example, for the same time every day.

In the third and fourth embodiment, the condition for determining whether or not the file is automatically deleted may be any condition.

In the third and fourth embodiments, the length of period becoming a target calculating the past average value can be arbitrarily changed.

In the third and fourth embodiments, the condition for determining whether or not the file is automatically deleted may take separate statistics such as a maximum value into consideration instead of the average value.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A file transfer apparatus comprising:
   a communication device that communicates with a second file transfer apparatus to allow exchange of transfer information between a first terminal and a second terminal;
   a storing device that includes a region for storing the transfer information,
   a determination unit that determines an insufficient state when a latest value of a numerical value, which is associated with a remaining capacity of a memory buffer and which varies depending on a use situation of the region, meets a predetermined condition, and
   a notification unit that notifies the insufficient state to a predetermined notification destination, as a response to the determination of the insufficient state by the determination unit,
   wherein the determination unit uses a condition, which a variation of the numerical value in a predetermined period to be greater than statistics of a variation of past numerical value in same time division as present, and the variation to be greater than the remaining capacity of the region, as the predetermined condition.

2. The apparatus of claim 1, wherein
   the transfer information is transmission information that is transmitted by the file transfer apparatus, or reception information that is received by the file transfer apparatus.

3. The apparatus of claim 1, wherein
   the region includes a first region that stores transmission information transmitted by the file transfer apparatus as the transfer information, and a second region that stores reception information received by the file transfer apparatus as the transfer information, the determination unit determines that the first region is in the insufficient state when the latest value of a first numerical value, which varies depending on the first use situation, meets a predetermined first condition, and the determination unit determines that the second region is in the insufficient state when the latest value of a second numerical value, which is based on a second remaining capacity of the memory buffer and which varies depending on the second use situation, meets a predetermined second condition, and the notification unit notifies the user so that it is possible to distinguish that the determination is performed on either of the first and second regions depending on the determination of the insufficient state by the determination unit.

4. The apparatus of claim 1, wherein
the notification unit notifies the insufficient state to a user by transmitting an electronic mail to a predetermined address.

5. The apparatus of claim 1, wherein
the notification unit notifies the insufficient state to a user by changing a user interface screen depending on whether or not the insufficient state is determined by the determination unit.

6. The apparatus of claim 1, wherein
the notification unit creates history information that indicates a history determined as the insufficient state by the determination unit, and notifies the insufficient state to a user by displaying a screen that indicates a content of the history information.

7. The apparatus of claim 1, further comprising:
a deletion unit that deletes one, which meets the predetermined condition among the transfer information, from the region.

8. The apparatus of claim 7, wherein
the deletion unit performs the deletion when the insufficient state is not relieved during a predetermined time after the insufficient state is newly determined by the determination unit.

9. A control method of a file transfer apparatus including a storing device comprising:

communicating with a second file transfer apparatus by a communication device on the file transfer apparatus, to allow exchange of transfer information between a first terminal and a second terminal;

determining as an insufficient state when the latest value of a numerical value meets a predetermined condition, the numerical value, which is based on a remaining capacity of a memory buffer, varying depending on a use situation of a region included in the storing device for storing the transfer information, and notifying, as a response to the determination of the insufficient state, the gist thereof to a predetermined notification destination, wherein the determining uses a condition, which a variation of the numerical value in a predetermined period to be greater than statistics of a variation of past numerical value in same time division as present, and the variation to be greater than the remaining capacity of the region, as the predetermined condition.

* * * * *